(12) United States Patent
Balko

(10) Patent No.: US 10,664,196 B2
(45) Date of Patent: May 26, 2020

(54) RANDOM ACCESS FILE MANAGEMENT

(71) Applicant: Clipchamp IP Pty Ltd, Fortitude Valley QLD (AU)

(72) Inventor: Soeren Balko, Indooroopilly (AU)

(73) Assignee: Clipchamp IP Pty Ltd, Fortitude Valley QLD (AU)

( * ) Notice: Subject to any disclaimer, the term of this patent is extended or adjusted under 35 U.S.C. 154(b) by 31 days.

(21) Appl. No.: 16/036,490

(22) Filed: Jul. 16, 2018

(65) Prior Publication Data

US 2019/0018614 A1 Jan. 17, 2019

Related U.S. Application Data

(60) Provisional application No. 62/532,392, filed on Jul. 14, 2017.

(51) Int. Cl.
| | |
|---|---|
| *G06F 12/00* | (2006.01) |
| *G06F 13/00* | (2006.01) |
| *G06F 3/06* | (2006.01) |
| *G06F 12/02* | (2006.01) |
| *G06F 12/08* | (2016.01) |

(52) U.S. Cl.
CPC .......... *G06F 3/0659* (2013.01); *G06F 3/0604* (2013.01); *G06F 3/064* (2013.01); *G06F 3/0643* (2013.01); *G06F 3/0673* (2013.01); *G06F 12/0223* (2013.01); *G06F 12/08* (2013.01)

(58) Field of Classification Search
CPC ... G06F 3/0652; G06F 3/0604; G06F 12/0223
See application file for complete search history.

(56) References Cited

U.S. PATENT DOCUMENTS

| | | | | |
|---|---|---|---|---|
| 10,387,043 | B2* | 8/2019 | Yamamoto | G06F 3/0608 |
| 2015/0277802 | A1* | 10/2015 | Oikarinen | G06F 3/0614 |
| | | | | 711/114 |
| 2017/0235672 | A1* | 8/2017 | Hetzler | G06F 3/067 |
| | | | | 711/171 |
| 2018/0232181 | A1* | 8/2018 | Zhou | G06F 3/0611 |
| 2019/0018614 | A1* | 1/2019 | Balko | G06F 12/08 |

* cited by examiner

*Primary Examiner* — Sean D Rossiter
(74) *Attorney, Agent, or Firm* — Neugeboren O'Dowd PC

(57) ABSTRACT

A method for modifying a file having a file size exceeding a size of available main memory, the file arranged in one or more existing data blocks, by writing an array of new data to the file at a file offset to replace a portion of the existing data of the file. The method including determining one or more target data blocks of the file which contain data to be replaced, considering a size of the array of new data, the block size of the file and the file offset within the file, retrieving at least one of the target data blocks from the file, creating at least one new data block comprised of at least one of the one or more write byte arrays, and writing the new data block to the file at the location of the target data blocks.

12 Claims, 2 Drawing Sheets

RANDOM ACCESS FILE MANAGEMENT

PRIORITY

This application claims priority to U.S. Provisional Application Ser. No. 62/532,392, filed Jul. 14, 2017, entitled "Cross-platform Random Access File Storage," which is incorporated by reference herein in its entirety.

TECHNICAL FIELD

The present invention relates to the management of data within a file stored in random access memory.

BACKGROUND ART

The present invention relates generally to file storage and more specifically it relates to a cross-platform random access file storage for devices with limited file storage capabilities and main memory capacity, such as Web browsers, embedded computing devices, mobile computing devices, sensors with attached capabilities and others, to provide a system to store and access large files, such as video files, audio recordings, image files, 3D scene graph files and others, allowing for random file accesses, where it is possible to read and write data chunks of arbitrary size at arbitrary byte offsets within the file and where the overall main memory consumption of the system can be configured to an arbitrarily low number of bytes that are simultaneously occupied by the system at any given point in time.

It will be clearly understood that, if a prior art publication is referred to herein, this reference does not constitute an admission that the publication forms part of the common general knowledge in the art in any country.

SUMMARY OF INVENTION

The present invention is directed to a method and a system for file management, which may at least partially overcome at least one of the abovementioned disadvantages or provide the consumer with a useful or commercial choice.

In providing a random access file reading and writing capability with a low upper threshold for main memory consumption, an embodiment of the invention enables applications that produce large files by progressively writing data chunks at arbitrary byte offsets into that file to run on restricted runtime environments such as aforementioned devices (Web browsers, embedded computing devices, mobile computing devices, sensors with attached capabilities and others). For example, an embodiment of the invention may be suitable to serve as a random access data storage layer for video editing or encoding applications that store their output files on the client device.

With the foregoing in view, the present invention in one form, resides broadly in a method for modifying a file having a size exceeding a size of available main memory, the file comprising existing data arranged in one or more existing data blocks stored in at least one persistent memory source, by writing an array of new data to the file at a file offset within the file, to replace a portion of the existing data of the file, the method comprising: identifying a block size of the one more existing data blocks of the file; determining one or more target data blocks of the file, the target data blocks being existing data blocks of the file which contain data to be replaced by a portion of the array of new data, said determining taking into consideration a size of the array of new data, the block size of the file and the file offset within the file; determining one or more write byte arrays, each write byte array being a portion of the array of new data; performing one or more write operations, said write operations comprising the steps of: identifying a location of at least one of the one or more target data blocks within the file; retrieving the at least one of the one or more target data blocks from the file into available main memory; creating at least one new data block comprised of at least one of the one or more write byte arrays; and writing the at least one new data block to the file at the location of the at least one of the one or more target data blocks.

The new data block may be comprised of a portion of the write byte array and a portion of the at least one of the one or more target data blocks. The one or more write byte arrays may comprise a plurality of write byte arrays, each write byte array being a portion of the array of new data. The plurality of write byte arrays may collectively comprise the array of new data.

The method may include determining a block offset within the at least one new data block at which the at least one of the one or more write byte arrays is written. The new data block may be created by writing the contents of the at least one of the one or more target data blocks into the new data block, then writing the contents of the at least one of the one or more write byte arrays into the new data block at the block offset. The new data block may be created by writing a subset of the contents of the at least one of the one or more target data blocks into a first portion of the new data block, and writing the contents of the at least one of the one or more write byte arrays into a second portion of the new data block.

The one or more write operations may include a plurality of write operations, each write operation creating at least one new data block comprised of at least one of a plurality of write byte arrays. Each of the plurality of write byte arrays may be a unique portion of the array of new data.

The one or more target data blocks of the file may include a plurality of target data blocks. The plurality of target data blocks may be read from the persistent memory source in one operation. The plurality of target data blocks may be read from the persistent memory source in a series of operations. A plurality of new data blocks may be created, each new data block being comprised of one of the plurality of write byte arrays and a subset of one of the plurality of target data blocks. The plurality of new data blocks may be written to the persistent memory source in one operation. The plurality of new data blocks may be written to the persistent memory source in a series of operations. At least one of the plurality of new data blocks may be written to the persistent memory source before all the target data blocks have been retrieved from the persistent memory source. Retrieving the at least one target data block may comprise retrieving a handle of the at least one target data block in lieu of the data of the at least one target data block.

The method may be invoked by an application running within or in conjunction with a web browser application. The method may be enacted by a combination of one or more of an implementation of the type JAVASCRIPT, GOOGLE DART, WEB ASSEMBLY, ADOBE FLASH, MICROSOFT SILVERLIGHT, ORACLE JAVA or any other programming language and runtime environment that is supported by web browsers. All of the JAVASCRIPT implementation code may be replaced by native web browser capabilities that are exposed as APIs of a runtime environment.

Writing the at least one new data block to the file in the location of the at least one of the one or more target data blocks may include transforming a write request into one or more suitable network messages that are sent to the at least one persistent memory source.

According to another aspect of the invention, there is provided a system for modifying a file having a size exceeding a size of available main memory, the file comprising existing data arranged in one or more existing data blocks stored in at least one persistent memory source, by writing an array of new data to the file at a file offset within the file, to replace a portion of the existing data of the file, the system comprising: a file controller, configured to interface with main memory; and a memory interface, configured to provide an interface between the at least one persistent memory source and the file controller; the file controller configured to: identify a block size of the one more existing data blocks of the file; determine one or more target data blocks of the file, the target data blocks being existing data blocks of the file which contain data to be replaced by a portion of the array of new data, said determining taking into consideration a size of the array of new data, the block size of the file and the file offset within the file; determine one or more write byte arrays, each write byte array being a portion of the array of new data; perform one or more write operations, said write operations comprising the steps of: identifying a location of at least one of the one or more target data blocks within the file; instructing the memory interface to retrieve the at least one of the one or more target data blocks from the file into available main memory; creating at least one new data block comprised of at least one of the one or more write byte arrays; and instructing the memory interface to write the at least one new data block to the file at the location of the at least one of the one or more target data blocks.

A preferred aim of the disclosure is to provide a cross-platform random access file storage and management for devices with limited file storage capabilities and main memory capacity (such as Web browsers, embedded computing devices, mobile computing devices, sensors with attached capabilities and others) to provide a system to store and access large files (such as video files, audio recordings, image files, 3D scene graph files and others) allowing for random file accesses, where it is possible to read and write data chunks of various sizes at various byte offsets within the file and where the overall main memory consumption of the system can be configured to a low number of bytes that are simultaneously occupied by the system at any given point in time.

In providing a random access file reading and writing capability with a low upper threshold for main memory consumption, the disclosure may enable applications that produce large files by progressively writing data chunks at various, possibly irregular or arbitrary, byte offsets into that file to run on restricted runtime environments such as aforementioned devices (Web browsers, embedded computing devices, mobile computing devices, sensors with attached capabilities and others). For example, the invention is suitable to serve as a random access data storage layer for video editing or encoding applications that store their output files on the client device.

Another preferred aim of the disclosure is to describe a cross-platform random access file storage and access method that provides an application programming interface (API) that provides methods to (i) seek to a byte offset within the file, (ii) read a given number of bytes from the file at the current offset, (iii) write a given byte sequence to the file at the current offset, (iv) determine the current size of the file, (v) truncate the file to a given size, and (vi) to transfer the file into an alternative representation that is natively supported on the device (such as a Javascript Blob instance in a Web browser).

Another preferred aim of the disclosure is to describe a cross-platform random access file storage and access method that uses natively supported data storage and lookup facilities and their corresponding APIs that are available on the given computing device to store the data contained in the file. Examples of natively supported simple data storage facilities are the WORLD WIDE WEB CONSORTIUM (W3C) INDEXED DATABASE API, the WEB HYPERTEXT APPLICATION TECHNOLOGY WORKING GROUP (WHATWG) WEB STORAGE API, the MOZILLA CORPORATION FILEHANDLE API, the W3C WEB SQL DATABASE API, the W3C FILE WRITER API, the WHATWG XMLHTTPREQUEST API (for server-side storage), the W3C WEB REAL-TIME COMMUNICATION (WEBRTC) API (for storing the file on another client computer or server) or any other data storage technology capable of storing and retrieving named data chunks (binary large objects) as a whole, but is not necessarily able to read or write byte sequences within a data chunk.

In other words, an embodiment of the invention may improve the data storage capabilities in comparison to the aforementioned simple data storage facilities. Specifically, an embodiment of the invention provides the ability to store an array of new data (which is a byte sequence that is an arbitrarily large fragment of the entire modified file) at a byte offset within the file without having to load the entire file into main memory, altering it, and writing back the entire file. That includes the ability that subsequent operations of writing arrays of new data at different byte offsets can be "in order", thus appending data to the file or "out of order" thus overwriting previously written data or filling gaps in the file.

Another preferred aim of an embodiment of the invention is to provide cross-platform random access file modification that can limit the amount of main memory that is needed to store large files to the number of bytes that are required to hold a byte sequence in main memory that is either written to the file or read from the file. An embodiment of the invention does not require loading the entire file into main memory to either write a byte sequence to it or read a byte sequence from it.

This allows an embodiment of the invention to modify a file which has a size that exceeds the size of available main memory. Available main memory, is memory accessible by a processor, which is available for use by the processor for the purposes of modifying a file or set of files. The size of available main memory may be a static size or a size that is variable or changeable. The size of available main memory may be influenced by a range of factors, internal or external to the controlling processor. The size of main memory that is available to be used to modify a file may be dependent upon the number and types of files being simultaneously managed by an embodiment of the invention. Furthermore, the size of main memory that is available to be used to modify a file may be dependent upon the number and type of processes that currently have access to the main memory or are anticipated to do so in the future. An embodiment of the invention may reserve, or allocate a portion of main memory that is presently unutilised, thus reducing the size of main memory available to be used to modify a file. Alternatively, an embodiment of the invention may allocate, or be allocated, a portion (or set of portions) of main memory to be available to be used to modify a file.

Accordingly, an embodiment of the invention can be configured to use an amount of available main memory which is smaller than the size of the file, to write an array of new data into the file any byte offset within the file.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Accordingly, it is to be understood that any of the features described herein can be combined in any combination with any one or more of the other features described herein within the scope of the invention.

There has thus been outlined, rather broadly, some of the features of the invention in order that the detailed description thereof may be better understood, and in order that the present contribution to the art may be better appreciated. There are additional features of the invention that will be described hereinafter.

BRIEF DESCRIPTION OF DRAWINGS

Preferred features, embodiments and variations of the invention may be discerned from the following detailed description which provides sufficient information for those skilled in the art to perform the invention. The detailed description is not to be regarded as limiting the scope of the preceding Summary of the Invention in any way. The detailed description will make reference to a number of drawings as follows.

DESCRIPTION OF EMBODIMENTS

Figure 1:
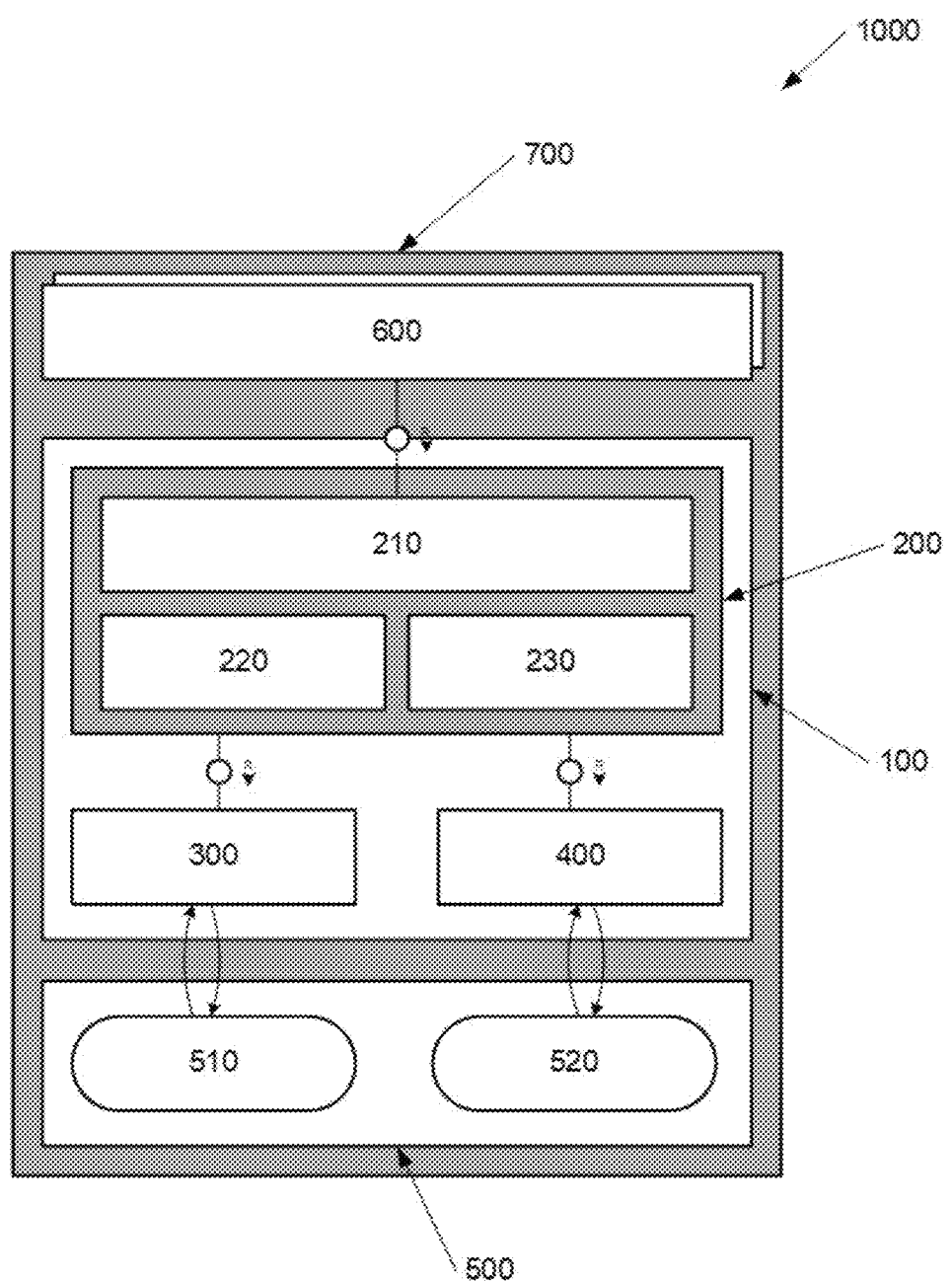
FIG. 1 is a block diagram of the principal components of an embodiment of the invention that is embedded into a runtime environment.

Turning now descriptively to the figures, in which similar reference characters denote similar elements throughout the several views. FIG. 1 illustrates a file metadata storage and lookup component 300, a binary large object ("blob") storage and lookup component 400, and a file controller component 200.

An embodiment of the invention 100 includes a file metadata storage and lookup component 300, a binary large object ("blob") storage and lookup component 400, and a file controller component 200. An embodiment of the invention 100 further interfaces with a simple data storage and lookup facility 500, which is external to the embodiment of the invention and part of the underlying runtime environment 700. An arbitrary number of applications 600 that are concurrently running on the runtime environment 700 may simultaneously interface with the embodiment of the invention 100.

An embodiment of the invention 100 further interfaces with a simple data storage and lookup facility 500, which is external to the embodiment of the invention 100 and part of the underlying runtime environment 700. An arbitrary number of applications 600 that are concurrently running on the runtime environment 700 may simultaneously interface with the embodiment of the invention 100.

The file metadata and lookup component 300 is a software service running in the runtime environment 700 or a hardware component that is attached to the runtime environment 700, which can store, update, lookup, and delete file metadata, such as the file name, its current size, the MULTI-PURPOSE INTERNET MAIL EXTENSIONS (MIME) type, the file creation timestamp, the file update timestamp, the user identifier ("principal") of the file (such as an email address, a LIGHTWEIGHT DIRECTORY ACCESS PROTOCOL, LDAP "distinguished name", a phone number and the like) and other properties that can collectively be represented as a collection of key-value pairs, where the key is a unique identifier and the value is a string of characters or digits representing the associated value. The file metadata storage and lookup component 300 interfaces with the simple data storage and lookup facility 500, serializing file metadata into a native format that can be stored by the simple data storage and lookup facility 500. Inversely, the file metadata storage and lookup component 300 also interfaces with the simple data storage and lookup facility 500 to retrieve and de-serialize metadata from the native format to a collection of key-value pairs.

In doing so, the file metadata and lookup component 300 provides an interface having the following functions: (i) store a collection of key-value pairs and associated it to a file handle, which is a unique identifier representing a file, (ii) retrieve the collection of key-value pairs that are associated to a given file handle, (iii) update the set of key-value pairs for a given file handle, (iv) delete all key value pairs for a given file handle, and (v) list all file handles for which the file metadata storage and lookup component at present maintains a collection of key-value pairs.

The file metadata storage and lookup component 300 provides the capabilities to store, lookup, update, and delete a collection of key-value pairs (file metadata), related to a unique file handle. It does so by serializing the file metadata into a format that is suitable to be stored inside the simple data storage and lookup facility 500 and be retrievable by providing a file handle (such as a unique file name, a UNIVERSALLY UNIQUE IDENTIFIER—UUID, a UNIFORM RESOURCE IDENTIFIER—URI or the like). Serializing the file metadata entails encoding the contained key-value pairs in a text or binary format that is supported by the simple data storage and lookup facility 500, such as JAVASCRIPT OBJECT NOTATION (JSON), EXTENSIBLE MARKUP LANGUAGE (XML), GOOGLE PROTOCOL BUFFERS or any other data serialization format that can package the file metadata based on key-value pairs and can be stored within the simple data storage and lookup facility. Augmenting the data serialization capability, the file metadata storage and lookup component 300 shall further provide the inverse capability to de-serialize data that was retrieved from the simple data storage and lookup facility 500 into a collection of key-value pairs, denoting the file metadata.

The variations of the file metadata storage and lookup component 300 are determined by the API and native storage format of the simple data storage and lookup facility 500. For example, a simple data storage and lookup facility 500 that is an instance of the W3C INDEXED DATABASE (INDEXEDDB) requires the file metadata and lookup component 300 to adapt to the INDEXEDDB programming model, which comprises controlling the database transaction lifecycle, serializing the file metadata into the INDEXEDDB object store paradigm with records that are identified by a nominated property from the record, such as the file handle, and looking up and updating records in INDEXEDDB using the INDEXEDDB APIs. In another variant of the file metadata storage and lookup component 300, the underlying simple data storage and lookup facility 500 may be a WHATWG WEBSTORAGE API, which is in itself a key-value persistent data store. The file metadata storage and lookup component 300 may have to employ a secondary serialization protocol to first package the file metadata into a string (using JSON, XML, UNIFORM RESOURCE LOCATOR encoding or the like) and then associate that string to the key being the file handle. Alternatively, the simple data storage and lookup facility may be a HYPERTEXT TRANSPORT PROTOCOL (HTTP) "cookie", which is a HTTP header value backed by a server-side persistent storage. In this case, the file metadata storage and lookup component 300 has to manipulate the HTTP cookie string through suitable APIs that are made available by the runtime environment 700. In yet another variant of the file metadata and lookup component 300, there is no persistent storage that is local to the runtime environment 700 and the simple data storage and lookup facility 500 is in fact a server API that is accessible through HTTP requests, where the file metadata and lookup component 300 has to issue HTTP requests to a server, which interprets these requests to store, fetch, update, and delete serialized file metadata from a server-side database.

The blob storage and lookup component 400 is a software service running in the runtime environment 700 or a hardware component that is attached to the runtime environment 700, which interfaces to one or more sources of persistent memory to persistently store an ordered list of binary large objects (blobs), representing data blocks of a file and where each blob is identified by a file handle and a sequence number greater or equal to 0 and which has a data compartment (or data block) being a fixed-size array of bytes.

The data blocks of the file are arranged in an ordered sequence and stored in the blob storage and lookup component, which provides persistent memory to store the data. The data blocks may be arranged within persistent memory in a physically-sequential arrangement. Alternatively, the data blocks may be distributed across one or more persistent memory sources as an ordered list which is not stored in a physically-sequential arrangement.

The blob storage and lookup component 400 can load a sequence of blobs into main memory, those blobs representing data blocks of a file and being identified by their associated file handle and sequence numbers. Finally, the blob storage and lookup component 400 can remove some or all blobs that are associated to a file handle, those blobs being identified by their sequence numbers. The blob storage and lookup component 400 can use any underlying primitive data storage capability 500 that is available to the runtime environment 700 and offering basic data access operations, namely to persistently store a sequence of bytes and to load a sequence of bytes back into main memory in a read operation.

The blob storage and lookup component 400 provides the capabilities to retrieve and store a sequence of blocks (or "pages") of a file, each block comprising a sequence number and a data compartment holding the actual data content of that block. Each block is keyed by the file's handle and its sequence number. The method to store a sequence of blocks takes the blocks as input and the method to retrieve a sequence of blocks takes the file handle and the sequence number range (given as the smallest and greatest sequence number in that range) as input. The blob storage and lookup component 400 interfaces with the simple data storage and lookup facility 500 to store the individual blocks, which it previously serializes into a format like JSON, XML, GOOGLE PROTOCOL BUFFERS or any other format that is suitable to hold the structured data defining a block. Inversely, the blob storage and lookup component 400 de-serializes the raw data it receives from the simple data storage and lookup facility 500 in its native format into an in-memory representation of a block.

In addition, the blob storage and lookup component 400 provides the capability to delete all blocks that pertain to a file, taking the file handle and the range of sequence numbers of the file's blocks as input. The blob storage and lookup component 400 will form a composite key out of the file handle and each contained sequence number to locate and remove the associated block in the simple data storage and lookup facility 500.

The variations of the blob storage and lookup component 400 are determined by the API and native storage format of the simple data storage and lookup facility 500. For example, a simple data storage and lookup facility 500 that is an instance of the W3C INDEXED DATABASE (INDEXEDDB) requires the blob storage and lookup component 400 to adapt to the INDEXEDDB programming model, which comprises controlling the database transaction lifecycle, serializing each block (being a structured record out of the file handle, a sequence number and the data compartment, which is an array of byte values) into the INDEXEDDB object store paradigm with records that are identified by a composite key out of the file handle and sequence number of the block and looking up and updating records in INDEXEDDB using the INDEXEDDB APIs. In another variant of the blob storage and lookup component 400, the simple data storage and lookup facility 500 is a W3C WEBRTC-based remote storage system, where the runtime environment 700 builds up a peer-to-peer connection to another system, such as a client computing device or a server computer. The simple data storage and lookup facility 500 would in this case forward all requests to store, update, read, or delete blocks to the other system, which may have a database or sufficiently large main memory storage that serves as the backing data store for the blocks. Data that is retrieved from the backing data store on the other system is passed back to the simple data storage and lookup facility 500 in the local runtime environment 700. In this W3C WEBRTC-based implementation, transporting blocks from and to the simple data storage and lookup facility 500 from and to the other system may use different connectivity channels that are part of the WEBRTC standard. For instance, the WEBRTC DATA CHANNEL API may use the INTERNET ENGINEERING TASK FORCE (IETF) STREAM CONTROL TRANSMISSION PROTOCOL (SCTP) to losslessly transport the blocks. Alternatively, the WEBRTC PEER CONNECTION may use the IETF SECURE REAL-TIME TRANSPORT PROTOCOL (SRTP) to transmit audio and video streams, encoding and compressing these streams prior to transmission using standard audio and video codecs, such as the MOVING PICTURE EXPERTS GROUP (MPEG) ADVANCED VIDEO CODING (AVC, also referred to as H.264), GOOGLE VP8, XIPH. ORG OPUS and others. For blocks whose data compartment is part of an audio or video file, the WEBRTC PEER CONNECTION API may thus provide a more efficient, albeit lossy way of transporting the blocks from the simple data storage and lookup facility 500 to another system with an attached backing store.

The file controller component 200 is the central component of the embodiment of the invention 100. It receives requests to write arbitrarily sized new data chunks into a named file at a byte offset, from an application 600. The file controller component 200 then interacts with the file metadata storage and lookup component 300 and the blob storage and lookup component 400 to retrieve, create, update, or delete file metadata or blobs representing portions of the file's data, respectively. Further, the file controller component 200 provides an interface to the applications 600, which provides random access file read and write operations.

The file controller component 200 is the central component of the embodiment of the invention 100. It receives commands to seek to a random byte offset, write arbitrarily large data chunks into a file, read an arbitrary number of bytes from the file, truncate the file, and delete the file from an application 600 by its random access file interface 210. After receiving a read, write, or delete request, it is passed to the page mapping analyzer 220, which breaks up the request to identify the blocks (identified by their sequence numbers) that are affected by the operation. The resulting sequence number range is then passed to the file operation mediator 230, which interfaces with the file metadata storage and lookup component 300 to load the corresponding file metadata into main memory. In case of a write operation, the file operation mediator 230 then interfaces with the blob storage and lookup component 400 to load the affected blocks into main memory, apply the write operation and write back the blocks using the corresponding method of the blob storage and lookup component 400. Subsequently, the file operation mediator 230 also interfaces with the file metadata storage and lookup component 300 to update altered properties of the file's metadata, such as the file size, the timestamp of last access, etc.

In case of a read operation, the file operation mediator 230 then interfaces with the blob storage and lookup component 400 to load the affected blocks into main memory and through the random access file interface 210, return them to the application 600. In case of a delete operation, the file operation mediator 230 then interfaces with the blob storage and lookup component 400 to delete the affected blocks. Subsequently, the file operation mediator 230 interfaces with the file metadata storage and lookup component 300 to also remove the associated file metadata. If the random access file interface 210 receives a request to truncate a file or to seek to a byte offset, it will interface with the file metadata storage and lookup component 300 to update the corresponding properties, relating to the file size or byte offset.

According to another embodiment of the invention, the file controller component 200 may incrementally load blocks that are affected by a write operation into main memory. By loading, updating, and writing back one block at a time, the overall main memory need is reduced to the size of a single block's data compartment.

According to another embodiment of the invention, the underlying simple data storage and lookup facility 500 offers a way to load blocks without loading their data compartment into main memory. Instead, a "blob handle" such as a JAVASCRIPT "Blob" instance is returned, which other APIs of the runtime environment 700 can use to form a continuous virtual file, which is constructed from the blob handles alone and where subsequent read accesses to that virtual file are automatically broken up to read accesses to the different underlying data compartments.

According to a further embodiment of the invention, the file controller component 200 automatically determines a suitable size of the data compartment of blocks that are maintained by the blob storage and lookup component 400. This automatic determination of data compartment sizes can happen in response to the total available main memory, where smaller data compartment sizes trade a lower overall main memory use of file operations with a greater number of accesses to the blob storage and lookup component 400.

The embodiment of the invention 100 runs within a runtime environment 700 and comprises the file controller component 200, the file metadata storage and lookup component 300, and the blob storage and lookup component 400. The embodiment of the invention 100 further depends on the presence of a simple data storage and lookup facility 500 that is part of the runtime environment 700.

The file controller component 200 consists of a random access file interface 210, a page mapping analyzer, 220, and a file operation mediator 230.

For the purpose of the embodiment of the invention 100, the simple data storage and lookup facility 500 is subdivided into two parts, holding the collective file metadata 510 of all files that are managed by the embodiment of the invention 100 and the corresponding blob chains 520, which are the blocks (or "pages") corresponding to those files.

The embodiment of the invention 100, may be a JAVASCRIPT implementation running in a Web browser. In another variant, some or all of the JAVASCRIPT code is replaced by implementations in GOOGLE DART, WEB ASSEMBLY, ADOBE FLASH, MICROSOFT SILVERLIGHT, ORACLE JAVA or any other programming language and runtime environment that is supported by Web browsers. In yet another variant, some or all of the JAVASCRIPT code is replaced by native Web browser capabilities that are exposed as APIs of the runtime environment 700.

According to another embodiment of the invention 100, the runtime environment 700 is the operating system of an embedded computing device, a sensor with an attached computing device, a mobile computing device such as a mobile phone or tablet computer, or any other computing device that has limited main memory capacity and lacks the built-in capability to perform random read and write accesses to files.

According to another embodiment of the invention 100, the runtime environment 700 may be a virtualized, sandboxed computing platform, such as a virtual machine, a container (such as a DOCKER container instance), a hardware emulator and the like, which has limited main memory capacity or lacks the built-in capability to perform random read and write accesses to files.

According to another embodiment of the invention 100, the runtime environment 700 lacks a built-in local simple data storage and lookup facility 500, making it necessary to physically store the file metadata and blocks ("pages") on an external device, such as a server computer or another client computing device. In this variant of an embodiment of the invention 100, the simple data storage and lookup facility 500 may be split into a local proxy component that can receive and process requests from any other component of the runtime environment 700 (including the file controller component 200), transform these requests into suitable network messages that are sent to the external device, which performs the actual storage request.

Figure 2:
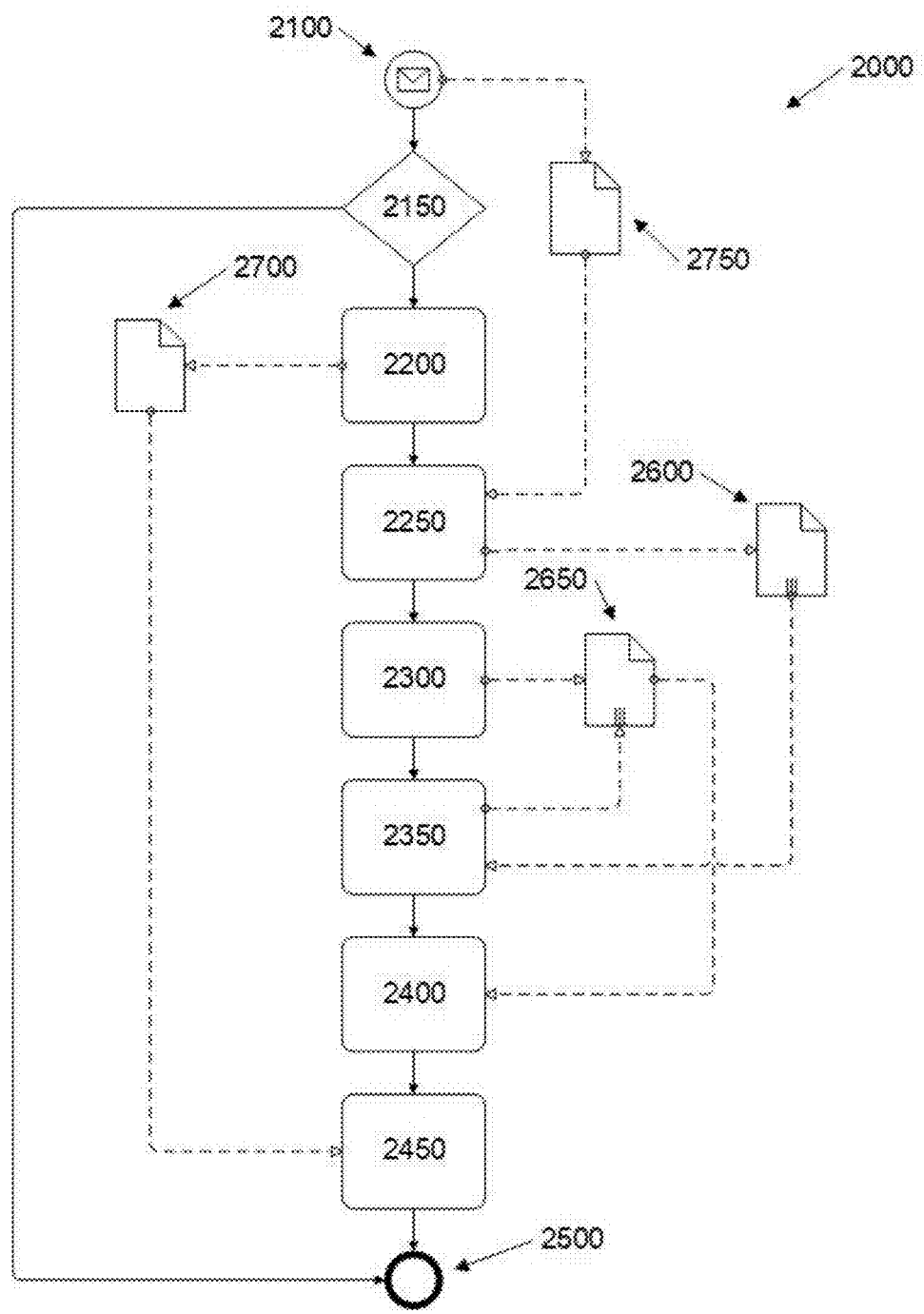
FIG. 2 is a flowchart illustrating a sub-operation of an embodiment of the present invention.

FIG. 2 is a flowchart 2000 in BUSINESS PROCESS MODELING NOTATION (BPMN) that illustrates the sequence of steps to perform a write operation in accordance with an embodiment of the invention. A byte array of new data (which is a data chunk in the form of a byte array of arbitrary length) is written to a file at the current byte offset. The current byte offset is a property of the file metadata (besides the file handle, the file size and other optional properties). The current byte offset is initially equal to the original size of the file and is altered after any write operation to be the previous byte offset plus the size of the written byte array of new data. In addition to that, a seeking operation overwrites the byte offset by setting it to any positive integer number greater or equal to 0.

In step 2100, the request to write the byte array of new data 2750 is received by the random access file interface 210 of the file controller component 200 from an application 600.

In step 2150, the random access file interface 210 determines if the byte array of new data 2750 has zero length, which means that no bytes are to be written. In this case, the algorithm skips to the end 2500.

Otherwise (when the byte array of new data 2750 contains at least one byte), in step 2200, the page mapping analyzer 220 interfaces with the file metadata storage and lookup component 300 to retrieve the file metadata 2700.

In step 2250, the page mapping analyzer 220 splits the byte array of new data 2750 into a sequence of write operations 2600. Taking into account the byte offset and the block size (both of which are part of the file metadata 2700), each element of the sequence of write operations 2600 is a record that gives a (1) a sequence number that gives the data block (within the file) to which the write operation pertains, (2) a subset of the byte array of new data 2750, referred to as a write byte array, which is a byte array that has no more bytes than the block size and (3) a block offset, which is an integer number greater or equal to 0 that represents the offset of the write operation's write byte array on the current block. The write byte arrays of the different pages may be logical views onto the byte array of new data 2750 or physical in-memory copies of the data contained in the byte array of new data 2750.

In step 2300, the file operation mediator 230, which is a sub-component of the file controller component 200, invokes the blob storage and lookup component 400 to retrieve the sequence of target data blocks 2650, being a subset of the existing data blocks which correspond to the sequence numbers of the write operations 2600 determined in step 2250. If a write operation has a sequence number for which there is not currently an existing data block, it is omitted from the resulting sequence of target data blocks 2650.

In step 2350, the file operation mediator 230 applies the write operations 2600 to the sequence of target data blocks 2650. To do so, the blocks from the sequence of target data blocks 2650 are matched to the write operations 2600 having the same sequence number. If a write operation has no corresponding block (e.g. when data is appended to the end of the file for which there is not currently a block of data), an empty block of data is created.

Once all pairs of write operation, target data block are determined, a new data block being a continuous array of bytes is created by fusing the target data block (which is existing data) with the write byte array in the write operation (as produced by step 2250). Fusing an target data block and a write byte array is an operation where first the total size of the resulting byte array is determined to be the maximum out of (1) the target data block's size and (2) the write operations block offset plus the size of the write byte array. Subsequently, a new byte array having the previously determined total size of bytes is allocated and has its elements initialized to 0. Then, the target data block and the write byte array are copied into the newly allocated new byte array at an offset of 0 and the page operation's page offset, respectively. After all pairs of write byte array, target data block are fused into new byte arrays, these byte arrays are assigned to an (updated) sequence of new data blocks 2650.

In step 2400, the file operation mediator 230 interfaces with the block storage and lookup component 400 to write back the updated sequence of new data blocks 2650 to the file.

Alternatively, the file operation mediator 230 may apply the plurality of write operations in series, interfacing with the block storage and lookup component 400 to write back each of the updated new data blocks in a series of operations. Where a plurality of target blocks are identified, an embodiment of the invention may begin writing back one or more new data blocks before all of the target blocks have been read from the file.

In step 2450, the file metadata 2700 has its byte offset and file size properties updated to reflect the applied write operation. Then, the page operation mediator 230 interfaces with the file metadata storage and lookup component 300 to update the file metadata.

In step 2500, the process ends and the random access file interface 210 signals the successful completion of the write operation to the invoking application 600.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A method for modifying a file having a file size exceeding a size of available main memory, the file comprising existing data arranged in one or more existing data blocks stored in at least one persistent memory source,
by writing an array of new data to the file at a file offset within the file, to replace a portion of the existing data of the file,
the method comprising:
identifying a block size of the one more existing data blocks of the file;
determining one or more target data blocks of the file, the target data blocks being existing data blocks of the file which contain data to be replaced by a portion of the array of new data, said determining taking into consideration a size of the array of new data, the block size of the file and the file offset within the file;
determining one or more write byte arrays, each write byte array being a portion of the array of new data;
performing one or more write operations, said write operations comprising the steps of:
identifying a location of at least one of the one or more target data blocks within the file;
retrieving the at least one of the one or more target data blocks from the file into the available main memory;
creating at least one new data block comprised of at least one of the one or more write byte arrays; and
writing the at least one new data block to the file at the location of the at least one of the one or more target data blocks, wherein the new data block is created by writing a subset of the contents of the at least one of the one or more target data blocks into a first portion of the new data block, and writing the contents of the at least one of the one or more write byte arrays into a second portion of the new data block.

2. A method for modifying a file having a file size exceeding a size of available main memory, the file comprising existing data arranged in one or more existing data blocks stored in at least one persistent memory source,
by writing an array of new data to the file at a file offset within the file, to replace a portion of the existing data of the file,
the method comprising:
identifying a block size of the one more existing data blocks of the file;
determining one or more target data blocks of the file, the target data blocks being existing data blocks of the file which contain data to be replaced by a portion of the array of new data, said determining taking into consideration a size of the array of new data, the block size of the file and the file offset within the file;
determining one or more write byte arrays, each write byte array being a portion of the array of new data;
performing one or more write operations, said write operations comprising the steps of:
identifying a location of at least one of the one or more target data blocks within the file;
retrieving the at least one of the one or more target data blocks from the file into the available main memory;
creating at least one new data block comprised of at least one of the one or more write byte arrays; and
writing the at least one new data block to the file at the location of the at least one of the one or more target data blocks, wherein the one or more write operations includes a plurality of write operations, each write operation creating at least one new data block comprised of at least one of a plurality of write byte arrays.

3. The method of claim 2, wherein each of the plurality of write byte arrays is a unique portion of the array of new data.

4. The method of claim 2, wherein the one or more target data blocks of the file includes a plurality of target data blocks.

5. The method of claim 4, wherein the plurality of target data blocks is read from the persistent memory source in one operation.

6. The method of claim 4, wherein the plurality of target data blocks is read from the persistent memory source in a series of operations.

7. The method of claim 4, wherein a plurality of new data blocks is created, each new data block being comprised of one of the plurality of write byte arrays and a subset of one of the plurality of target data blocks.

8. The method of claim 7, wherein the plurality of new data blocks is written to the persistent memory source in one operation.

9. The method of claim 7, wherein the plurality of new data blocks is written to the persistent memory source in a series of operations.

10. The method of claim 7, wherein at least one of the plurality of new data blocks is written to the persistent memory source before all the target data blocks have been retrieved from the persistent memory source.

11. A system for modifying a file having a size exceeding a size of available main memory, the file comprising existing data arranged in one or more existing data blocks stored in at least one persistent memory source,
by writing an array of new data to the file at a file offset within the file, to replace a portion of the existing data of the file,
the system comprising:
a file controller, configured to interface with main memory; and
a memory interface, configured to provide an interface between the at least one persistent memory source and the file controller;
the file controller configured to:
identify a block size of the one more existing data blocks of the file;
determine one or more target data blocks of the file, the target data blocks being existing data blocks of the file which contain data to be replaced by a portion of the array of new data, said determining taking into consideration a size of the array of new data, the block size of the file and the file offset within the file;
determine one or more write byte arrays, each write byte array being a portion of the array of new data;
perform one or more write operations, said write operations comprising the steps of:
identifying a location of at least one of the one or more target data blocks within the file;
instructing the memory interface to retrieve the at least one of the one or more target data blocks from the file into available main memory;
creating at least one new data block comprised of at least one of the one or more write byte arrays; and
instructing the memory interface to write the at least one new data block to the file at the location of the at least one of the one or more target data blocks, wherein the new data block is created by writing a subset of the contents of the at least one of the one or more target data blocks into a first portion of the new data block, and writing the contents of the at least one of the one or more write byte arrays into a second portion of the new data block.

12. A system for modifying a file having a size exceeding a size of available main memory, the file comprising existing data arranged in one or more existing data blocks stored in at least one persistent memory source, by writing an array of new data to the file at a file offset within the file, to replace a portion of the existing data of the file, the system comprising:
   a file controller, configured to interface with main memory; and
   a memory interface, configured to provide an interface between the at least one persistent memory source and the file controller;
   the file controller configured to:
      identify a block size of the one more existing data blocks of the file;
      determine one or more target data blocks of the file, the target data blocks being existing data blocks of the file which contain data to be replaced by a portion of the array of new data, said determining taking into consideration a size of the array of new data, the block size of the file and the file offset within the file;
   determine one or more write byte arrays, each write byte array being a portion of the array of new data;
   perform one or more write operations, said write operations comprising the steps of:
      identifying a location of at least one of the one or more target data blocks within the file;
      instructing the memory interface to retrieve the at least one of the one or more target data blocks from the file into available main memory;
      creating at least one new data block comprised of at least one of the one or more write byte arrays; and
      instructing the memory interface to write the at least one new data block to the file at the location of the at least one of the one or more target data blocks, wherein the one or more write operations includes a plurality of write operations, each write operation creating at least one new data block comprised of at least one of a plurality of write byte arrays.

* * * * *